United States Patent

Shereyk et al.

[11] Patent Number: 5,851,097
[45] Date of Patent: Dec. 22, 1998

[54] ARTICLE WITH TETHERED PRONG FASTENER

[75] Inventors: David A. Shereyk, Homewood; Thomas A. Benoit, Bourbonnais, both of Ill.

[73] Assignee: Illinois Tool Works Inc., Glenview, Ill.

[21] Appl. No.: 868,284

[22] Filed: Jun. 3, 1997

[51] Int. Cl.⁶ .................................................. F16B 19/00
[52] U.S. Cl. ............................................ 411/508; 411/913
[58] Field of Search .................................. 411/508, 509, 411/510, 913; 24/297, 452

[56] References Cited

U.S. PATENT DOCUMENTS

| D. 269,851 | 7/1983 | Kimura . | |
|---|---|---|---|
| 3,893,208 | 7/1975 | Yuda . | |
| 4,728,068 | 3/1988 | Rivkin | 411/508 |
| 4,781,488 | 11/1988 | Hayashi | 411/508 |
| 5,035,154 | 7/1991 | Jonischus | 411/508 |
| 5,046,223 | 9/1991 | Kraus | 411/508 |
| 5,694,666 | 12/1997 | Hamamoto | 411/509 |

FOREIGN PATENT DOCUMENTS

| 41763 | 3/1977 | Japan | 411/508 |
|---|---|---|---|
| 300410 | 10/1992 | Japan | 411/508 |

*Primary Examiner*—Flemming Saether
*Attorney, Agent, or Firm*—Schwartz & Weinrieb

[57] ABSTRACT

An article with a tethered prong fastener having a first stem protruding therefrom, wherein the first stem has a distal end portion with a first resilient arm extending divergently outwardly therefrom and back toward the article, and a first flexible tether coupling the first resilient arm to the first stem. The first resilient arm is flexible inwardly toward the first stem and subsequently flexed back outwardly away from the first stem, whereby the first flexible tether member limits outward deflection of the first resilient arm away from the first stem, thereby improving fastening performance thereof without interfering with the inward flexing of the resilient arm. The tethered prong fastener is configurable as a clip useable for engageably retaining elongate body members, as a w-prong fastener fastenable through an opening in a workpiece, and as a spacing member useable for engaging and retaining first and second workpieces in spaced relation.

18 Claims, 2 Drawing Sheets

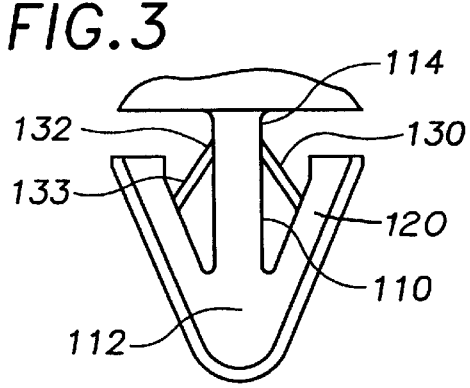
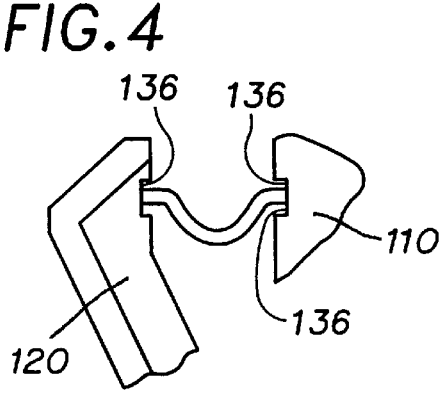
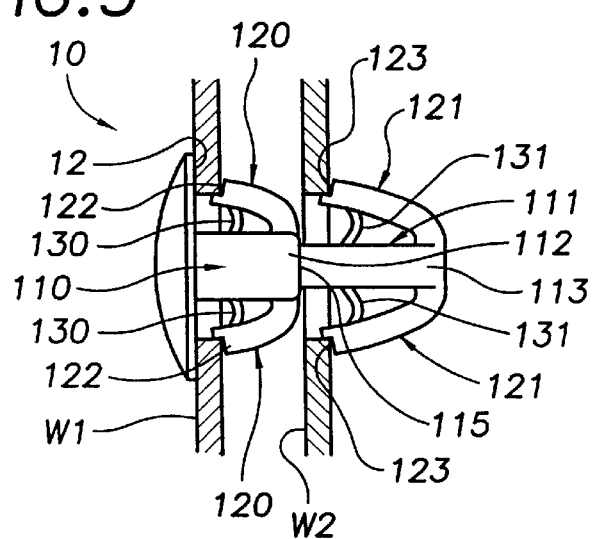
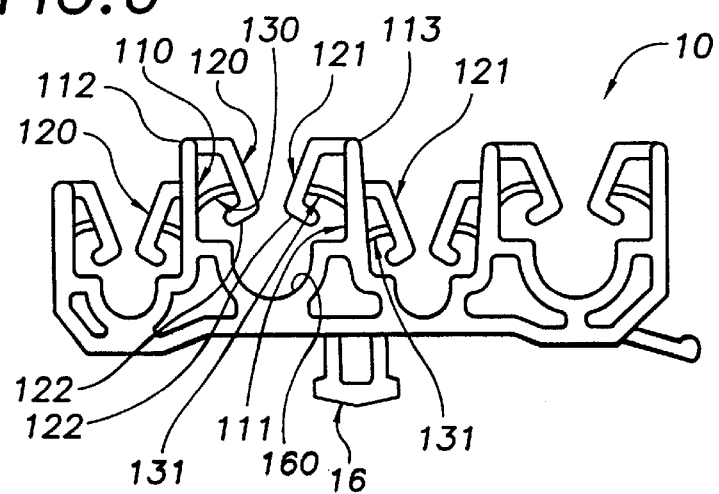

ARTICLE WITH TETHERED PRONG FASTENER

FIELD OF THE INVENTION

The present invention relates generally to articles having pronged fasteners, and more particularly to an improved pronged fastener configurable as a clip useable for engageably retaining body members, configurable as a w-prong fastener fastenable through an opening in a workpiece, and configurable as a spacing member useable for engaging and retaining first and second workpieces in spaced relation, among other configurations.

BACKGROUND OF THE INVENTION

Articles having pronged fasteners are known generally and are useable for fastening the article to a workpiece or alternatively for fastening one or more body members to a workpiece. U.S. Pat. No. Des. 269,851 entitled "Retainer Clip for Pipes, Rods and Other Elongated Bodies or the Like" issued on 26 Jul. 1983 to Kimura and commonly assigned herewith, for example, discloses a plurality of at least two adjacently arranged resilient w-prong fasteners, each formed by a corresponding stem portion having first and second outwardly divergently directed prongs or arm members. In operation, adjacent resilient arm members of adjacent w-prong fasteners are flexed inwardly flexible toward their corresponding stems so as to permit insertion of a body member therebetween, whereupon the resilient arm members subsequently flexibly return to the outwardly divergently directed configuration so as to retainably clip the body member to the article. The article itself is typically mountable to a workpiece by another w-prong fastener retainably disposeable in an opening through the workpiece, or by other means, whereby the body member is fastenably retained to the workpiece. This type of pronged fastener is formed of a lightweight plastic at a relatively low cost, and is used widely as a harness for mounting bundled wires, and more generally for mounting elongated members in automotive and other industries.

Yet another application of pronged fasteners is the separation of two or more plate members, or workpieces. U.S. Pat. No. 3,893,208 entitled "Plastic Device for Spacing and Holding Two or More Plates" issued on 8 July 75 to Yuda also commonly assigned herewith, for example, discloses first and second resilient w-prong fasteners disposed in spaced relation along corresponding first and second stems connectedly arranged along a common axis, wherein the first stem has a head portion and an enlarged diameter relative to the second stem forming a shoulder therebetween. Corresponding first and second resilient arms of each w-prong fastener are inwardly flexible so as to permit passage thereof through first and second openings of corresponding first and second workpieces oriented in spaced relation. According to the operation of U.S. Pat. No. 3,893,208, the first workpiece is engaged between the head portion and the first w-prong fastener, and the second workpiece is engaged between the shoulder formed by the first and second stems and the second w-prong fastener, whereby the first and second workpieces are maintained in separated spaced relation by the pronged fastener.

While articles having pronged fasteners of the types discussed above are used successfully in many applications, the pronged fasteners are subject to failure upon application of a sufficiently great external load thereto. More specifically, in applications of the type discussed generally in U.S. Pat. No. 3,893,208 wherein the resilient prongs form part of a w-prong fastener retainably disposed through an opening of a workpiece, a load applied axially along the stem, in a direction tending to withdraw the w-prong fastener back through the opening of the workpiece, tends to outwardly deflect the resilient prongs, which anchor the w-prong fastener in the opening of the workpiece. At some load level, the resilient prongs eventually fail by folding backwardly along the stem axis, possibly shearing or otherwise breaking away therefrom, whereupon the w-prong fastener is withdrawn from the opening of the workpiece. A similar failure of the resilient prongs occurs under excessive loading conditions imposed by the body member in applications of the type discussed in U.S. Pat. No. Des 269,851, whereupon the clipped body member is withdrawn from between the failed resilient prongs. To compensate for these overloading conditions, it is possible to use heavier duty pronged fasteners, but this solution increases weight, requires additional space, and very likely increases material and production costs.

The present invention is accordingly drawn toward novel advancements in pronged fasteners, and more particularly to novel articles having novel pronged fasteners that overcome problems in the prior art.

OBJECTS OF THE INVENTION

It is thus an object of the invention to provide articles having novel pronged fasteners with improved fastening performance, articles with novel pronged fasteners that are economical, and more particularly unitary articles with novel pronged fasteners that are readily formed in a plastic molding operation, and articles with novel pronged fasteners that are useable interchangeably in applications fitted presently with prior art pronged fasteners.

It is another object of the invention to provide an article with a novel pronged fastener useable for fastening the article to a workpiece, for fastening one or more body members, elongated or otherwise, to a workpiece, for maintaining first and second workpieces in separated spaced relation, among other applications, and for combinations thereof.

It is a more particular object of the invention to provide an article with a novel tethered prong fastener having a first stem protruding from the article, the first stem having a distal end portion with a first resilient arm extending divergently outwardly therefrom and back toward the article, and the tethered prong fastener having a first flexible tether coupling the first resilient arm to the first stem, the first resilient arm being flexible inwardly toward the first stem and subsequently flexible back outwardly away from the first stem, whereby the first flexible tether member limits the outward deflection of the first resilient arm away from the first stem, thereby improving fastening performance thereof.

It is a related object of the invention to provide an article with a novel tethered prong fastener having a first stem with a first resilient arm extending divergently outwardly therefrom, the tethered prong fastener having a first flexible tether member coupling the first resilient arm to the first stem, the first flexible tether member having a first end coupled to a base of the first stem and a second end coupled to a distal end of the first stem, whereby the first flexible tether member is oriented at an angle relative to the first stem, and in another configuration, the first flexible tether member has a pre-flex radius between the first stem and the first resilient arm, and in yet another configuration, either or both of the first resilient arm and the first stem has a recess about the first flexible tether member so as to extend the flexible length of the flexible tether member.

It is a further object of the invention to provide an article having a novel tethered w-prong fastener defined by a first stem protruding from the article, the first stem having a distal end with a plurality of at least two resilient prongs, or resilient arms, extending divergently outwardly therefrom and back toward the article, the tethered w-prong fastener also having a plurality of flexible tethers each coupling a corresponding one of the plurality of resilient arms to the first stem, the plurality of resilient arms being flexible inwardly toward the first stem so as to permit insertion of the tethered w-prong fastener through an opening in a workpiece, the plurality of resilient arms subsequently flexing back outwardly away from the first stem so as to retainably fasten the article to the workpiece, whereby the plurality of flexible tether members limit outward deflection of the plurality of resilient arms away from the first stem, but do not prevent insertion of the w-prong fastener through the opening of the workpiece.

It is still another object of the invention to provide an article with a plurality of at least two novel tethered w-prong fasteners arranged serially for engaging and retaining a corresponding plurality of workpieces in spaced relation.

It is yet another object of the invention to provide an article with a plurality of at least two novel tethered w-prong fasteners arranged adjacently, wherein adjacent resilient arm members of adjacently arranged w-prong fasteners are inwardly flexible toward their corresponding stems as so to permit insertion of a body member therebetween, whereupon the resilient arm members subsequently flexibly return to the outwardly divergently directed configuration so as to retainably clip the body member to the article.

BRIEF DESCRIPTION OF THE DRAWINGS

These and other objects, features and advantages of the present invention will become more fully apparent upon careful consideration of the following Detailed Description of the Invention and the accompanying Drawings, which may be disproportionate for ease of understanding, wherein like structure and steps are referenced by corresponding numerals and indicators; and wherein:

FIG. 2B is an end elevation view along lines 2B—2B of FIG. 2a.

FIG. 3 is a partial side elevation view of an article having a tethered prong fastener according to a third exemplary embodiment of the invention.

FIG. 4 is a partially enlarged view of an alternative tether portion configuration.

FIG. 5 is a side elevation view, partly in cross-section of an article having a tethered prong fastener according to still another exemplary embodiment of the invention.

FIG. 6 is a side elevation view of an article having a tethered prong fastener according to yet another exemplary embodiment of the invention.

DETAILED DESCRIPTION OF THE INVENTION

Figure 1:
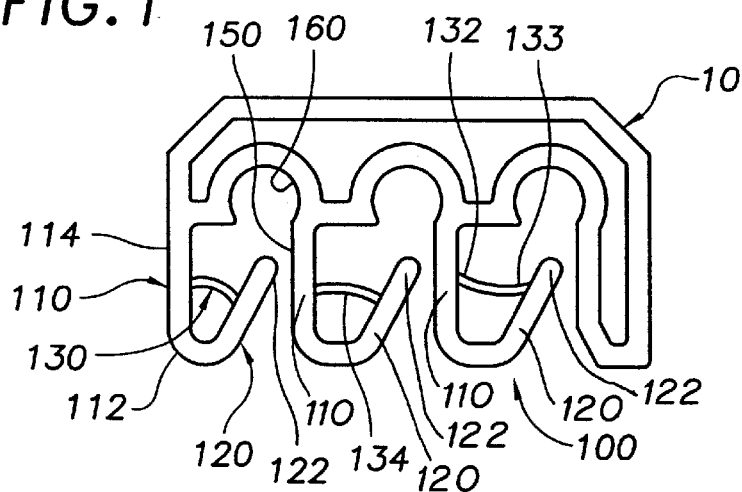
FIG. 1 is a side elevation view of an article having a tethered prong fastener according to an exemplary embodiment of the invention.

FIG. 1 shows an article 10 having a plurality of tethered prong fasteners 100 each defined generally by a stem 110 protruding from the article 10 and at least one resilient arm 120 coupled to a distal end portion 112 of the stem 110. The resilient arm 120 has an end portion 122 extending divergently outwardly away from the stem 110 and toward a base portion 114 of the stem 110, which is generally back toward the article 10. The resilient arm 120 is flexible inwardly toward the stem 110 and outwardly away from the stem 110 as discussed further below.

A flexible tether member 130 couples the stem 110 and the resilient arm 120, and includes generally a first end 132 coupled to the stem 110 and a second end 133 coupled to the resilient arm 120, whereby the flexible tether member 130 limits outwardly deflection of the resilient arm 120 away from the stem 120, but does not interfere with the inwardly flexing of the resilient arm 110. In one embodiment, the the flexible tether member 130 forms a thin flexible web between the stem 110 and the resilient arm 120, which is particularly suitable to formation in a plastic molding operation.

Figure 2A:
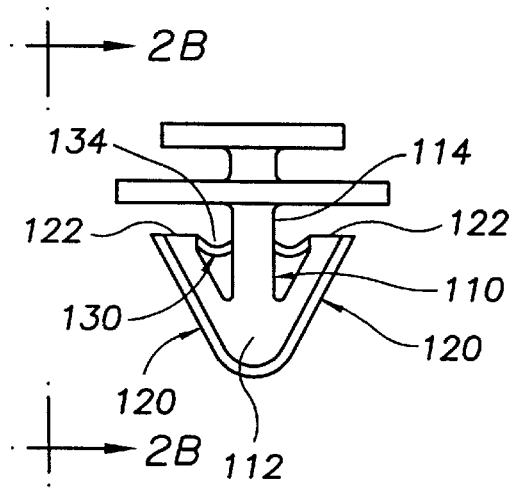
FIG. 2A is a side elevation view of an article having a tethered prong fastener according to another exemplary embodiment of the invention.
Figure 2B:
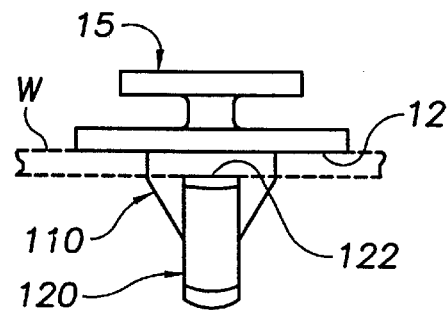
Figure 2C:
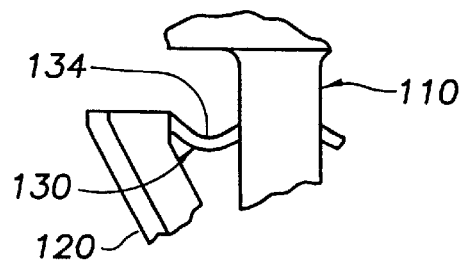
FIG. 2C is a partially enlarged view of a tether portion of FIG. 2A.

In the exemplary embodiment of FIGS. 1 and 2, the flexible tether member 130 has a pre-flex radius 134 between the stem 110 and the resilient arm 120 to facilitate inwardly flexing of the resilient arm 120 toward the stem 110. In the exemplary embodiment of FIG. 3, the first end 132 of the flexible tether member 130 is coupled to the stem 110 toward the base 114 thereof, and the second end 133 of the flexible tether member 130 is coupled to the resilient arm 120 toward the distal end portion 112 of the stem 110, whereby the first flexible tether member 130 is oriented at an angle relative to the first stem as as to facilitate inwardly flexing of the resilient arm 120 toward the stem so as 110. The pre-flexed radius 134 of the flexible tether member 130 shown in FIGS. 1 and 2 may be combined with the angled flexible tether member configuration of FIG. 3, or the first and second ends of the flexible tether member 130 may coupled to the stem 110 along a line substantially perpendicular thereto as shown in FIG. 2.

According to a related aspect of the invention, the flexible tether member 130 is resiliently stretchable to some extent when the resilient arm 120 is flexed outwardly. FIG. 4 accordingly shows an alternative embodiment, wherein the stem 110 and the resilient arm 120 have a recess 136 formed in the stem 110 and in the resilient arm 120 each about the first and second ends of the flexible tether member 130 where the flexible tether member 130 is coupled thereto. According to this aspect of the invention, the recess 136, which is formed about the tether member 130 on at least one of the stem 110 or the resilient arm 120, extends the overall effective length of the flexible tether member 130 between the stem 110 and the resilient arm 120 thereby increasing the amount or extent to which the flexible tether member 130 is resiliently stretchable when the resilient arm 120 is flexed outwardly under loading conditions as discussed further below. The flexible tether member configurations of FIG. 4 are useable in combination with any one or more of the flexible tether member configurations discussed above.

The article 10 of FIG. 1 is configured with a plurality of J-clips for retainably clipping corresponding body members, not shown, to the article 10. The tethered prong fasteners 100 each have associated therewith a support member 150 protruding from the article 10 in spaced relation to a corresponding stem 110 of the corresponding tethered prong fastener 100. The support member 150 in the exemplary embodiment is advantageously the stem 110 of an adjacent tethered prong fastener, but more generally is any structural member protruding from the article 10. In operation, the resilient arm 120 of each tethered prong fastener 100 is flexible inwardly away from the corresponding support member 150 and toward its stem 110 so as to permit insertion of the body member between the stem 110 and the support member 150 and into a seat 160, which may be configured to accommodate an elongated wire bundle or other body member. The resilient arm 120 is subsequently flexed from the stem away from the stem 110 upon insertion of the body member into the seat 160 wherein the end portion 122 of the resilient arm 120 retainably clips the body member in the seat 160 between the stem 110 and the support member 150. The resilient arm 120 reacts to gravitational or other loading conditions tending to unseat the body member by flexing, or deflecting, outwardly to retainably clip the body member to the article. The flexible tether member 130 however resiliently limits outward deflection of the resilient arm 120 thereby increasing the degree of loading that the resilient arm 120 may withstand before failure and providing remarkable performance improvement over non-tethered prior art pronged fasteners.

The article 10 of FIG. 2 is configured as a tethered w-prong fastener retainably fastenable through an opening in a workpiece W, shown in phantom in FIG. 2B, wherein the article 10 has some useful body configuration 15. The stem 110 includes first and second resilient arms 120 coupled toward the distal end portion thereof, wherein the first and second resilient arms each have a first end portion 122 extending divergently outwardly away from the stem 110 and toward the base portion 114 thereof. Associated with each resilient arm 120 is a corresponding flexible tether member 130 coupling the corresponding resilient arm 120 to the stem 110. In operation, the first and second resilient arms 120 are flexible inwardly toward the stem 110 so as to permit insertion of the stem 110 and the first and second resilient arms 120 through the opening of the workpiece. The first and second resilient arms 120 are subsequently flexed outwardly away from the stem 110 upon insertion through the opening of the workpiece W so that the workpiece is engaged between a clamping surface 12 of the article 10 and the end portions 122 of the first and second resilient arms 120 of the tethered w-prong fastener so as to retainably fasten the article 10 to the workpiece W. The first and second resilient arms 120 react to gravitational or other loading conditions tending to withdraw the article, and particularly the w-prong fastener, from the opening in the workpiece by deflecting outwardly to retainably fasten the article 10 to the workpiece. The flexible tether member 130 however resiliently limits outward deflection of the first and second resilient arms 120 thereby increasing the degree of loading that the resilient arms 120 may withstand before failure and providing a remarkable performance improvement over non-tethered prior art w-prong fasteners.

The article 10 of FIG. 5 includes first and second tethered w-prong fasteners arranged serially along a common axis and retainably fastenable through first and second openings in corresponding separated first and second workpieces W1 and W2, wherein the article 10 maintains the first and second workpieces in spaced relation. The first tethered w-prong fastener is formed by first and second resilient arms 120 coupled toward the distal end portion 112 of a first stem 110, and tethered to the first stem 110 by corresponding first and second flexible tether members 130 as discussed above. The second tethered w-prong fastener is formed by first and second resilient arms 121 coupled toward the distal end portion 113 of a second stem 111, and tethered to the second stem 111 by corresponding first and second flexible tether members 131 as discussed above. The first stem 110 has a larger diameter than the second stem 111 thereby forming a shoulder 115 therebetween. In operation, the resilient arms of the first and second w-prong fasteners are inwardly flexible toward the corresponding first and second stems so as to permit insertion of the first and second w-prong fasteners through corresponding openings of the first and second workpieces W1 and W2. The first and second resilient arms are subsequently flexed outwardly away from the corresponding first and second stems upon insertion through the openings of the workpieces, wherein the first workpiece W1 is engaged between a clamping surface 12 of the article 10 and corresponding end portions 122 of the first and second resilient arms 120 of the first tethered w-prong fastener, and the second workpiece W2 is engaged between the shoulder 115 and corresponding end portions 123 of the first and second resilient arms 121 of the second tethered w-prong fastener. The resilient arms react to any loading condition tending to withdraw the article 10, and particularly the tethered w-prong fasteners, from the openings in the workpieces W1 and W2 by deflecting outwardly to retainably fasten the article 10 to the workpieces. The flexible tether members however resiliently limit outward deflection of the resilient arms thereby increasing the degree of loading that the resilient arms may withstand without failure and providing a remarkable performance improvement over non-tethered prior art w-prong fasteners.

The article 10 of FIG. 6 includes a plurality of at least first and second tethered w-prong fasteners arranged adjacently for retainably clipping one or more body members, not shown, to the article 10. The first tethered w-prong fastener is formed by first and second resilient arms 120 coupled toward the distal end portion 112 of a first stem 110, and tethered to the first stem 110 by corresponding first and second flexible tether members 130 as discussed above. The second adjacent tethered w-prong fastener is formed by first and second resilient arms 121 coupled toward the distal end portion 113 of a second stem 111, and tethered to the second stem 111 by corresponding first and second flexible tether members 131 as discussed above. The resilient arms associated with a particular stem may alternatively be axially offset as shown to accommodate different size body members, and tethered prong fasteners at end portions of the article 10 may have only one resilient arm, as shown. The article 10 moreover may have an additional fastener 16, which may also be a tethered w-prong fastener, for mounting the article 10 to a workpiece, thereby coupling body members to the workpiece. In operation, resilient arms 120 and 121 of the adjacent tethered w-prong fasteners are flexed inwardly toward the corresponding first and second stems 110 and 111 so as to permit insertion of the body member between the adjacent stems 110 and 111 and into a seat 160, configured to accommodate a wire bundle or other body member. The resilient arms 120 and 121 are subsequently flexed outwardly away from the corresponding stems 110 and 111 upon insertion of the body member into the seat 160 wherein corresponding end portion 122 of the resilient arms retainably clip the body member in the seat 160. The resilient arms react to loading conditions tending to unseat the body member by deflecting outwardly to retainably clip the body member to the article. The flexible tether members however resiliently limit outward deflection of the resilient arms thereby increasing the degree of loading that the resilient arms withstand before failure and providing a remarkable performance improvement over non-tethered prior art fasteners.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. An article having a prong fastener, comprising:
   a substantially transversely extending base member;
   a first stem protruding substantially axially from and substantially perpendicular to said substantially transversely extending base member, and having a base portion, connected to said substantially transversely extending base member of said article, and a distal end portion;
   a first resilient arm flexibly connected at a first end portion thereof to said distal end portion of said first stem and extending divergently outwardly away from said first stem such that a second distal end portion of said first resilient arm extends toward said base portion of said first stem whereby said first resilient arm and said second distal end portion thereof are flexibly movable toward and away from said first stem, said first resilient arm also comprising a side surface portion facing said first stem; and
   a first flexible tether member fixedly connected to said surface portion of first resilient arm and a first axially extending side surface portion of said first stem whereby said first flexible tether member limits outward deflection of said first resilient arm away from said first stem.

2. The article of claim 1, wherein the first flexible tether member has a first end coupled to the first stem toward the base portion of the first stem, and the first flexible tether member has a second end coupled to the first resilient arm toward the distal end portion of the first stem, whereby the first flexible tether member is oriented at an angle relative to the first stem.

3. The article of claim 2, wherein the first flexible tether member comprises a first thin flexible web.

4. The article of claim 1, wherein the first flexible tether member has a first end coupled to the first stem and a second end coupled to the first resilient arm, and the first flexible tether member has a pre-flex radius defined between the first stem and the first resilient arm.

5. The article of claim 1, wherein at least one of the first stem and the first resilient arm has a recess about an end of the first flexible tether member so as to extend the length of the first flexible tether member.

6. The article of claim 1, further comprising:
   means, for retainably housing a body member, comprising a support member defining a seat portion within which a body member can be supportably seated,
   said first resilient arm being flexible toward said first stem so as to permit insertion of a body member into said seat portion of said support member, and being flexible away from said first stem upon insertion of a body member into said seat portion of said support member whereby a body member can be retained upon said article as a result of the body member being clamped between said first resilient arm and said seat portion of said support member.

7. The article as set forth in claim 6, further comprising:
   at least one additional seat portion defined within said support member for retainably housing at least one additional body member;
   at least one additional stem, substantially identical to said first stem, protruding from said base member;
   at least one additional resilient arm, substantially identical to said first resilient arm, flexibly connected to said at least one additional stem; and
   at least one additional flexible tether member, substantially identical to said first flexible tether member, fixedly connected to both said at least one additional stem and said at least one additional resilient arm.

8. The article as set forth in claim 7, wherein:
   said article comprises three seat portions defined within said support member, three stems protruding from said base member, three resilient arms respectively flexibly connected to said three stems, and three flexible tether members respectively fixedly connected to said three stems and said three resilient arms.

9. The article as set forth in claim 8, wherein:
   said three seat portions, said three stems, said three resilient arms, and said three flexible tether members are disposed within a transversely extending, side-by-side array across said substantially transversely extending base member.

10. The article of claim 1, further comprising:
    a second resilient arm flexibly connected at a first end portion thereof to said distal end portion of said first stem and extending divergently outwardly away from said first stem such that a second distal end portion of said second resilient arm extends toward said base portion of said first stem whereby said second resilient arm and said second distal end portion thereof, along with said first resilient arm and said second distal end portion thereof, are flexibly movable toward said first stem so as to permit insertion of said first stem and said first and second resilient arms through an opening defined within a workpiece, and are flexibly movable outwardly away from said first stem upon insertion of said first stem and said first and second resilient arms through the opening defined within the workpiece so as to retain said article mounted within the workpiece as a result of the workpiece being interposed between said base member and said second distal end portions of said first and second resilient arms; and
    a second flexible tether member fixedly connected to both said second resilient arm and a second axially extending side surface portion of said first stem whereby said second flexible tether member limits outward deflection of said second resilient arm away from said first stem.

11. The article of claim 10, further comprising:
    a first tethered w-prong fastener formed by said first and second resilient arms flexibly connected to said first stem; and
    a second tethered w-prong fastener substantially identical to said first tethered w-prong fastener and having a second stem extending substantially coaxially with respect to said first stem of said first tethered w-prong fastener, said first stem of said first tethered w-prong fastener having a first diametrical extent which is greater than a second diametrical extent of said second stem so as to form a shoulder between said first stem and said second stem,
    whereby the workpiece is able to be engaged between said base member and said first and second resilient arms of said first tethered w-prong fastener, and a second workpiece is able to be engaged between said shoulder, defined between said first and second stems, and said second tethered w-prong fastener such that said first and second tethered w-prong fasteners can mount said first and second workpieces in spaced relation with respect to each other.

12. The article of claim 1, further comprising:

means, for retainably housing a body member, comprising a support member defining a seat portion within which a body member can be supportably seated;

a second stem protruding substantially axially from and substantially perpendicular to said substantially transversely extending base member, and having a base portion, connected to said substantially transversely extending base member of said article, and a distal end portion;

a second resilient arm flexibly connected at a first end portion thereof to said distal end portion of said second stem and extending divergently outwardly away from said second stem such that a second distal end portion of said second resilient arm extends toward said base portion of said second stem whereby said second resilient arm and said second distal end portion thereof are flexibly movable toward and away from said second stem; and a second flexible tether member fixedly connected to both said second resilient arm and a first axially extending side surface portion of said second stem whereby said second flexible tether member limits outward deflection of said second resilient arm away from said second stem;

said first and second resilient arms being flexible toward said first and second stems, respectively, so as to permit insertion of a body member therebetween and into said seat portion of said support member, and being flexible away from said first and second stems, respectively, upon insertion of a body member into said seat portion of said support member whereby a body member can be retained upon said article as a result of the body member being clamped between said first and second resilient arms and said seat portion of said support member.

13. The article as set forth in claim 12, further comprising:

at least one additional seat portion defined within said support member for retainably housing at least one additional body member;

at least one additional pair of first and second stems, substantially identical to said first and second stems, protruding from said base member;

at least one additional pair of first and second resilient arms, substantially identical to said first and second resilient arms, respectively flexibly connected to said at least one additional pair of first and second stems; and at least one additional pair of flexible tether members, substantially identical to said first and second flexible tether members, respectively fixedly connected to both said at least one additional pair of first and second resilient arms and said at least one additional pair of first and second stems.

14. The article as set forth in claim 13, wherein:

said article comprises four seat portions defined within said support member, four pairs of stems protruding from said base member, four pairs of resilient arms respectively flexibly connected to said four pairs of stems, and four pairs of flexible tether members respectively fixedly connected to said four pairs of stems and said four pairs of resilient arms.

15. The article as set forth in claim 14, wherein:

said four seat portions, said four pairs of stems, said four pairs of resilient arms, and said four pairs of flexible tether members are disposed within a transversely extending, side-by-side array across said substantially transversely extending base member.

16. The article as set forth in claim 15, wherein:

said four seat portions, said four pairs of resilient arms, and said four pairs of flexible tether members are axially offset with respect to each other.

17. The article as set forth in claim 16, wherein:

said four seat portions have different size dimensions so as to accommodate differently sized body members.

18. The article of claim 1, wherein:

said article comprises a plastic material.

* * * * *